United States Patent [19]

Koch

[11] Patent Number: 4,696,332

[45] Date of Patent: Sep. 29, 1987

[54] ELASTOMER FREE GRID REINFORCEMENT OF PRESSURABLE ELASTOMER REPAIRED ARTICLES

[75] Inventor: Russell W. Koch, Hartville, Ohio

[73] Assignee: The Firestone Tire & Rubber Company, Akron, Ohio

[21] Appl. No.: 872,311

[22] Filed: Jun. 9, 1986

Related U.S. Application Data

[63] Continuation-in-part of Ser. No. 718,666, Apr. 1, 1985, Pat. No. 4,618,519, which is a continuation-in-part of Ser. No. 584,426, Feb. 28, 1984, abandoned, and a continuation-in-part of Ser. No. 767,998, Apr. 21, 1985, abandoned, which is a continuation of Ser. No. 584,426, Feb. 28, 1984, abandoned.

[51] Int. Cl.$^4$ ............................................. B60C 21/00
[52] U.S. Cl. ..................................... 152/367; 156/95; 428/63
[58] Field of Search ..................... 428/36, 63; 152/370, 152/371, 367

[56] References Cited

U.S. PATENT DOCUMENTS

| | | |
|---|---|---|
| 3,143,156 | 8/1964 | Fagert et al. . |
| 3,644,256 | 2/1972 | Broisman . |
| 3,718,587 | 2/1973 | Bhakuni et al. . |
| 3,755,261 | 8/1973 | Van Gulick . |
| 3,779,794 | 12/1973 | DeSantis . |
| 3,834,934 | 9/1974 | Broisman . |
| 3,888,831 | 6/1975 | Kogon . |
| 3,966,530 | 6/1976 | Cutts et al. . |
| 3,991,255 | 11/1976 | Blaskiewicz et al. . |
| 4,085,283 | 4/1978 | Den Otter et al. . |
| 4,125,522 | 11/1978 | Becker . |
| 4,136,219 | 1/1979 | Odam et al. . |
| 4,143,454 | 3/1979 | Utsunomiya et al. . |
| 4,158,378 | 6/1979 | Pearson et al. . |
| 4,240,852 | 12/1980 | Gomberg et al. . |
| 4,300,970 | 11/1981 | Honda et al. . |
| 4,311,181 | 1/1982 | Hausch . |
| 4,327,138 | 4/1982 | Hausch . |
| 4,352,704 | 10/1982 | Williams et al. . |
| 4,399,852 | 8/1983 | Hausch .............................. 152/353 |
| 4,401,145 | 8/1983 | Hausch . |
| 4,434,832 | 3/1984 | Koch ................... 152/370 |
| 4,435,456 | 3/1984 | Hausch . |
| 4,465,535 | 8/1984 | Fieldhouse .......................... 152/97 |
| 4,485,135 | 11/1984 | Koch ..................................... 428/36 |
| 4,485,136 | 11/1984 | Koch et al. . |
| 4,544,427 | 10/1985 | Hausch . |

FOREIGN PATENT DOCUMENTS 1352645  5/1972  Netherlands .

OTHER PUBLICATIONS

PS-2682-71, Hughson Chemical Division, Lord Corporation.
"Room Temperature Vulcanizing Adhesive Based on Ethylene-Propylene-Diene Terpolymer", by Cantor, Uniroyal, Paper No. 18.

*Primary Examiner*—Christopher Henderson
*Attorney, Agent, or Firm*—Daniel N. Hall

[57] ABSTRACT

An elastomer article capable of being pressurized has a hollow extending therethrough. An elastomer free grid, generally in the form of a woven fabric, is located on the interior of the article in the vicinity of the hollow and prevents the same from being removed therefrom. An elastomer patch is utilized therewith.

11 Claims, 7 Drawing Figures

ELASTOMER FREE GRID REINFORCEMENT OF PRESSURABLE ELASTOMER REPAIRED ARTICLES

CROSS REFERENCE

The present invention is a continuation-in-part of U.S. application Ser. No. 718,666 filed Apr. 1, 1985, now U.S. Pat. No. 4,618,519, for "Tire Repair By "Patch Only" Method", which in turn is a continuation-in-part of U.S. application Ser. No. 584,426, filed Feb. 28, 1984, now abandoned. This application is also a continuation-in-part application of U.S. Ser. No. 767,998 filed Apr. 21, 1985, now abandoned, which in turn is a continuation of U.S. application Ser. No. 584,426, filed Feb. 28, 1984, now abandoned.

TECHNICAL FIELD

The present invention relates to a repaired pressurable article wherein the repaired portion, which is generally in the form of a filler or a plug, extends therethrough and to an elastomer free grid utilized in association therewith. More specifically, the present invention relates to the utilization of the grid in the interior portion of the pressurable article to protect the filler or plug from separation and/or removal from the article. Furthermore, the grid prevents a reinforced patch from being pushed down through the injured area by the internal pressure of the article.

BACKGROUND ART

Heretofore, to my knowledge there is no pertinent art which utilizes an elastomer free grid in association with a filler, a plug repair, or a patch repair.

Elastomer articles such as tires having a hollow therein have been repaired by adding a material to the hollow and curing the same in the presence of heat. Inasmuch as heat was required, proper equipment was necessary and hence the article had to be repaired in a retread or a repair facility.

U.S. Pat. Nos. 3,755,261 to VanGulick; 3,888,831 to Kogan; 3,834,934 to Broisman; 3,644,256 also to Broisman; and 3,718,587 to Bhakuni relate to amine curable curing agents, amine curable polymers, or R.F.L. type adhesives. However, these patents do not relate to the in situ repair of a reinforced elastomer article utilizing a cured preformed plug.

U.S. Pat. No. 3,779,794 to DeSantis relates to a moisture-curable polyurethane sealant primer system, whereas U.S. Pat. No. 4,085,283 to DenOtter relates to flame retardants utilized in cyanuric acid derivatives.

Product No. PS-2682-71 of the Hughson Chemical Division, Lord Corporation, relates to a surface primer for elastomeric substances utilizing a proprietary compound thought to be mono- or di-chloroisocyanuric acid.

An article entitle "Room Temperature Vulcanizing Adhesive Based on Ethylene-Propylene-Diene Terpolymer," Cantor, Uniroyal, Paper No. 18, presented to the Division of Rubber Chemistry of the American Chemical Society, Denver, Colo., Oct. 10, 1973, relates to various oxidants which effect ambient temperature cures of E.P.D.M.

U.S. Pat. No. 4,136,219 to Odam relates to a polyurethane paint which is applied to vulcanized rubbers.

British Pat. No. 1,352,645 relates to a polyurethane paint which is applied to vulcanized rubbers.

U.S. Pat. No. 4,125,522 to Becker relates to a polyurethane adhesive.

U.S. Pat. No. 3,966,530 to Cutts relates to triazoline diones which are utilized in lieu of chlorinated or halogenated donors for treating elastomeric surfaces to improve adhesion.

U.S. Pat. No. 3,143,156 to Fagert relates to utilizing a non-fully cured plug to repair an aperture extending entirely through a tire.

U.S. Pat. No. 4,143,454 to Utsonomiya relates to a method of attaching connecting parts of an offshore structure wherein a liquid rubber is applied over a treating solution which can contain a halogen molecule.

U.S. Pat. No. 4,158,378 to Pearson relates to a cured rubber tire having a specific polyurethane therein and to a chlorine water treatment step.

U.S. Pat. No. 3,991,255 to Blaskjiewicz relates to the adhesion of a polyurethane to an EPDM surface utilizing various adhesives.

U.S. Pat. No. 4,300,970 to Honda relates to a method of bonding vulcanized rubber to resin.

U.S. Pat. No. 4,240,852 to Gomberg relates only to the use of a cyanoacrylate adhesive.

U.S. Pat. No. 4,352,704 to Williams relates to applying tire tread to a tire.

U.S. Pat. Nos. 4,327,138 and 4,399,852 to Hausch relate to a composition and process for applying and bonding a curable polymer or prepolymer at ambient temperature to the surface of a cured elastomer substrate.

U.S. Pat. Nos. 4,401,145 and 4,311,181 to Hausch relate to the application to an indicia.

U.S. Pat. Nos. 4,434,832 to Koch and Barbin, 4,485,135 to Koch, and 4,485,136 to Koch and Hausch relate to ambient temperature cure of elastomers having a hollow therein as well to the utilization of a patch.

U.S. Pat. No. 4,465,535 to Koch, Fieldhouse and Oziomek relates to the use of a specific solvent, 1,4-dichloroethane, utilized in connection with a treating agent.

U.S. Pat. No. 4,435,456 to Hausch relates to the process and composition for repairing a hollow at ambient temperature in the surface of a cured elastomer substrate.

U.S. Pat. No. 4,544,427 to Hausch relates to the use of a polyisocyanate as a layer in repairing an elastomer article.

DISCLOSURE OF THE INVENTION

It is therefore an aspect of the present invention to provide a repaired elastomer article having an elastomer free grid in the vicinity of the repair.

It is another aspect of the present invention to provide a grid within the vicinity of a repair, as above, wherein the article is capable of being pressurized and wherein the grid is located on the interior portion of said article.

It is a further aspect of the present invention to provide a grid in the vicinity of a repair, as above, wherein the grid inparts increased stability to the damaged and repaired area.

It is a still further aspect of the present invention to provide a grid in the vicinity of a repair, as above, wherein large injuries in articles such as tires can be repaired and the separation and/or removal of a filler or plug in the repaired portion is reduced.

It is a yet further aspect of the present invention to provide a grid in the vicinity of a repair, as above, wherein said grid is a woven fabric.

These and other aspects of the present invention will become apparent from the following specification.

In general, a repaired elastomer article comprises the elastomer article, said elastomer article being cured and capable of being pressurized, said elastomer article having a hollow therein, said article having an interior hollow surface area, an elastomer free grid, said grid located on said article interior surface and traversing said interior hollow area; and said grid adhered to said article interior by an amine curable polymer or prepolymer.

PREFERRED EMBODIMENTS

Figure 1:
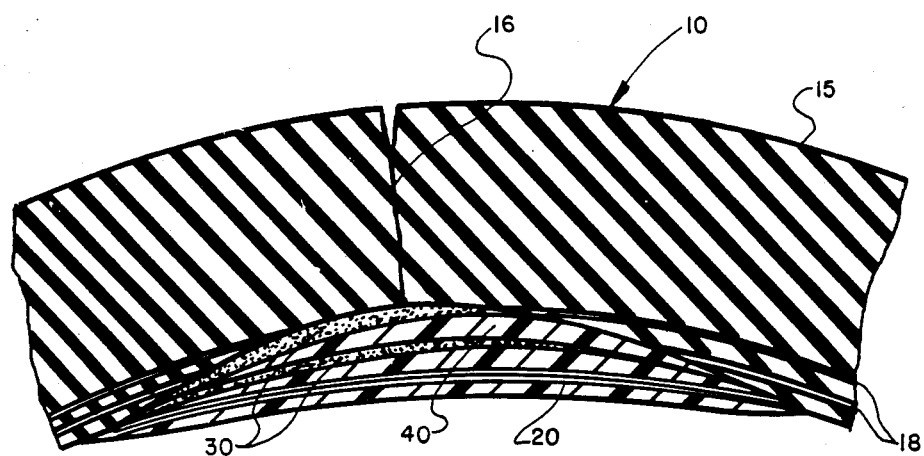
FIG. 1 is a cross sectional view showing the repair of a reinforced elastomer article having a crack/cut extending completely therethrough.

The grid aspect of the present invention will be discussed after a discussion of a crack/cut repair and a preformed plug.

A reinforced elastomer article having a crack or cut therein, that is a crack/cut, is repaired by utilizing a cured elastomer patch preferably having cords therein. The patch is used to repair the crack/cut which generally extends through the elastomer article. The patch is generally applied on the non-initially cut or internal side of the article and the cut itself, if an opening exists, generally need not be filled. Portion 15 of the article is shown having a cut or crack therein. For the purposes of the present invention, the cut or crack (crack/cut) generally extends through the entire article such that it is in need of repair. Article 10, such as a tire, conveyor belt or the like, generally has reinforcement therein such as in the form of cords 18. When crack 16 extends through the article having a pressurized gas therein, such as a tire, the article will gradually lose pressure unless the loss of gas is stopped. The loss of air pressure in a tire naturally makes it unsuitable for use.

The crack/cut can be caused by a number of items such as nails, bolts, screws, metal objects, rocks, spikes, equipment, and the like. The invention is ideally suited for large off-the-road tires although it can also be applied to normal passenger car tires, truck tires, conveyor belts, and the like.

In order to repair the elastomer article, the interior side, or that side of the article opposite the initial cut penetration, is prepared for the application of the patch thereto. Such preparation generally includes removal of the tire innerliner layer as well as removal of one or more layers located immediately thereunder. Since usually the cords in the areas of crack/cut are often damaged, they can be severed, outside of the damaged area, and removed. Oftentime portions of two or more of the tire cord plies are removed. The remaining exposed area is then buffed via any conventional apparatus or treatment. It is then cleaned utilizing conventional solvents such as acetone, rubber solvent, trichloroethane, and the like. Treating agent 30 is then applied to the cleaned area and allowed to dry. An amine curable polymer or prepolymer is than applied thereover. A cured patch 20 having a layer of treating agent 30 on one side thereof is then applied to the amine curable polymer or prepolymer layer 40. The thickness of the amine curable polymer or prepolymer 40 can vary but generally is between 1/16" to ⅛" thick and covers the area buffed out.

Upon cure, the repair obtained is usually equal to or stronger than the strength of the original article. Moreover, should the cut be large enough such that an opening exists on the exterior side, there is generally no need to fill said cut.

Another distinctive advantage of the present invention is that the amine curable polymer cures at ambient temperature. Thus, the repair can be made on the job site. That is, there is no need to take the tire or the article to the nearest retread shop or rubber repair shop which on some occasions can be hundreds of miles away.

Considering now the article to be repaired, or substrate 15, it is a cured rubber or elastomer, having unsaturated groups therein. The substrate can be any conventional elastomer or rubber known to those skilled in the art. For example, it can be made from conjugated dienes having from 4 to 12 carbon atoms such as butadiene, isoprene, and the like. It can also be made from natural rubber, that is from a substance which is obtained from various trees and plants which grow in the tropics or desert portions of the world. Such natural rubber generally has a content in excess of 90 and usually in excess of 95 percent of cis-1,4-polyisoprene. The substrate can also be made from various elastomeric copolymers such as those made from monomers of conjugated dienes having from 4 to 12 carbon atoms, as set forth above, and vinyl substituted aromatic compounds having from 8 to 15 carbon atoms. Examples of such vinyl substituted aromatic compounds include styrene, alpha-methylstyrene, and the like. An example of a specific copolymer is styrene-butadiene rubber.

Naturally, other types of rubber compounds can be utilized such as the so-called butyl rubbers, neoprene, that is polychloroprene, and the like, as well as blends of said above rubbers.

Suitable treating agents include the various N-halohydantoins, the various N-haloamides, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted S-triazinetriones, commonly known as mono-, di-, and trichloroisocyanuric acid. A preferred treating composition for use in the practice of the present invention are the various mono-, di-, or trichloroisocyanuric acids, or combinations thereof. Trichloroisocyanuric acid is especially preferred.

The treating agents usually exist in solid form. They are readily soluble in solvents such as acetone and the like and thus can be applied in liquid form. Application of the treating agent generally occurs at ambient temperatures. Application can occur through any conventional manner as through brushing, spraying, and the like. The amount applied is such that the rubber substrate surface is coated. Preferably, two or more coats of the treating agent or adhesive compound are used to ensure that all the cured rubber substrate surface has been coated.

A typical amount of the treating agent in the suitable solvent, for example ethyl acetate or acetone, is generally from about 0.1 to about 10 percent by weight based upon the total weight of said treating agent and solvent, and preferably from about 0.5 percent to about 5 percent. Of course, higher or lower concentrations can be utilized. This solvent system has been found to dry within a matter of minutes so that the amine curable polymer or prepolymer can be bonded to the treating agent. It is thought that the adhesive treating system adds halogen groups, for example, chlorine to the cured rubber which activates the cured rubber surface allowing the amine curable polymer or prepolymer system to adhere strongly to the cured rubber surface.

Of the various amine curable polymers or prepolymers, the urethanes are preferred. Other prepolymers or polymers which can be cured with the amine curing agent include the compounds set forth in U.S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212–221; halogen-containing hydrocarbon chlorinated polyethylene and polypropylene; chlorosulfonated polymers such as those described in the U.S. Pat. No. 2,723,257; polymers containing acid halide groups such as

and haloformate groups such as

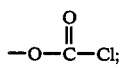

polymers containing anhydride groups which on reaction with diamines yield amide-acid linkages, and organa-polysiloxanes as described in U.S. Pat. No. 2,938,010.

The urethane prepolymers or polymers, that is, those which contain isocyanate groups, are generally formed by first reacting a polyether polyol or a polyester polyol with a molar excess of a diisocyanate to form a prepolymer having terminal isocyanate groups. The polymer is then cured to increase its molecular weight from less than about 3,000 upwards to over 10,000. Examples of such polymers are set forth in U.S. Pat. Nos. 2,620,516; 2,777,831; 2,843,568; 2,866,774; 2,900,368; 2,929,800; 2,948,691; 2,948,707; and 3,114,735, all of which are hereby fully incorporated by reference. Typical specific examples of such polyurethanes include Adiprene L-367, polytetramethylene ether glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; and Cyanaprene A-7, a polyester-based coating polymer with approximately 2.4 percent isocyanate end groups, manufactured by American Cyanamid. Blends of these polyurethanes can also be utilized. Moreover, it has been found, particularly with repair or application of the amine curable polymer to the patch area, that is the area between patch 20 and cured substrate 11, better adhesion is often obtained by utilizing two different types of urethane. For example, a urethane containing a high amount by weight of isocyanate end groups such as Adiprene L-367 can be blended with a urethane containing a low amount of weight of isocyanate end groups such as Adiprene L-42. The amount of one urethane to the other can range from about 1 to about 99 percent and desirably from about 30 to about 70 percent by weight.

To the amine curable prepolymer or polymer compound is added a conventional amine curing agent, known to those skilled in the art. Generally, any conventional or known amine curing agent can be used and, hence, only a few specific examples will be given. Thus, the curing agent can be MOCA, that is 4,4'-methylene bis(2-chloroaniline) or, desirably a complex of 4,4'-methylene dianiline and a salt, or a complex of racemic 2,3-di-(4-aminophenyl) butane and a salt, as set forth in U.S. Pat. No. 3,755,261 to Van Gulick which is hereby fully incorporated by reference. The latter two complexes are preferred. The methods for preparing the complexes are set forth in U.S. Pat. No. 3,755,261. A preferred salt utilized with the 4,4'-methylene dianiline compound is sodium chloride or lithium chloride. Due generally to availability and cost, the complexes or salts derived from 4,4'-methylene dianiline are highly preferred. Another class of amine curing agents which can be utilized are the various Versamides, that is the condensation products of polyamines and dibasic acids obtained when certain unsaturated fatty acids are polymerized, and are manufactured by Henkel Chemical Company.

The equivalent weight of the curing agent utilized with regard to the curable prepolymer or polymer generally ranges from about 85 percent to 115 percent with from about 95 to 105 percent being preferred.

Often to facilitate processing, the curing agent, and especially an amine curing agent such as the complex of 4,4'-methylene dianiline and a salt is utilized with a plasticizer such as dioctylphthalate on a 50 percent weight basis, or Flexol 4GO, tetraethylene glycol bis(2-ethyl hexanoate) manufactured by Union Carbide Corporation on a 50 percent weight basis. The amount of plasticizer can range from about 20 percent to about 60 percent.

The curing agent is blended with the prepolymer or polymers in various mixers such as dough mixers, high speed impellers, paddle-type mixers, and the like. Small batches can be mixed by stirring with a spatula. Usually, the prepolymer or polymer is a liquid. If not, when mixed with the polar solvent, a liquid mixture results. However, even if a solid curing agent is used, when added to the prepolymer or the polymer, and to a solvent system, a liquid system results even though the curing agent (e.g., amine) can be in the form of a dispersion. Thus, even though the system may contain solids therein, the solids exist in the form of a dispersion so that a liquid system is produced.

The curing agent and the amine curable polymers or prepolymers form the curable polymer system which is mixed with a polar solvent so that a liquid system is obtained which cures at ambient or room temperature, that is, the prevailing temperature as from about 10° C. to 50° C. Often the ambient temperature will range from about 15° C. to about 35° C. or 40° C. The polar solvents which can be utilized, especially with the amine curing agent and the amine polymers or prepolymers are, for example set forth in U.S. Pat. No. 3,888,831 to Kogon which is hereby fully incorporated by reference. Generally, the amount of solvent utilized per 100 parts by weight of the curable prepolymer or polymer ranges from about 2 to about 40, desirably from about 2 to about 20, and preferably from about 5 to about 15 parts by weight. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethyl ketone are highly preferred. The amount of curing agent, based upon said polymer or prepolymer, ranges from about 0.85 to about 1.15 equivalents.

Considering patch 20, it can generally be of any desired size so long as it adequately covers the surface area of the aperture. Generally, an appropriate patch size will be known to one skilled in the art of patch construction and/or patch application. The patch is made of rubber and is generally fully cured. Although cured natural rubber of composition containing at least 80 percent by weight of natural rubber is often preferred, any conventional type of cured rubber compound can be utilized. Thus, the patch can be made from a conjugated diene having from 4 to 12 carbon atoms, copolymers made from conjugated dienes having from 4 to 12 carbon atoms with vinyl substituted aromatics having from 8 to 15 carbon atoms, for example styrene butadiene rubber, and the like. In essence, the patch can be made out of the same type of rubber as the substrate. Often, the patch will have a cushioned layer thereon to alleviate stresses formed between the tire carcass and tire patch. However, this is not always necessary.

Since in the preferred embodiment of the present invention the substrate has cords therein, desirably the patch also has cords therein. More specifically, whenever approximately 25 percent to about 50 percent of the cords are damaged, severed, broken, etc., the strength of the cords in the patch is approximately equal to the strength of the total cords in the article before any injury thereto. However, should approximately 50 percent to 100 percent of all cords by damaged, severed, or otherwise injured, the strength of the cords in the patch is equal to the strength of the total cords in the article before injury thereto. Should the number of damaged cords in the article be less than approximately 25 percent, then, the strength of the remaining cords is usually adequate such that a reinforced patch need not be utilized. The cords in the patch can be made of polyester, nylon, steel, rayon and the like, with nylon being preferred.

The area around the cut or crack is buffed and cleaned as set forth above. Treating agent 30 is applied and then the amine curable polymer or prepolymer is applied. Treating agent 30 is also applied to one side of the patch. The ends of the patch can be taped to the substrate or held in place with a curing tube located inside the tire. The number of cords of the patch is as previously set forth. While the patch is held in place, the amide curable polymer or prepolymer cures at ambient temperatures.

In forming the amine curable polymer system, generally the amine curable polymer or prepolymer is mixed with the polar solvent and then the curing agent is added last. During cure, an effective and strong bond is formed between the prepolymer or polymer system and the treated elastomer substrate. Since the present invention relates to an ambient temperature cure, repair of large and cumbersome articles such as off-the-road tires, conveyor belts, and the like, can be made in situ. In other words, the repair can be made at the job site. The only accessory which may be required is a pneumatic bladder, although a sand bag can be used. In extreme cold weather it is desirable to bring the damaged area of the tire, through the use of heating pads, up to ambient temperature. Since the cure is ambient, no steam chambers, or other vulcanizable tire repair equipment are required. This, of course, also results in an energy savings.

It is to be understood that various conventional additives in conventional amounts can be added to the amine curing agent and prepolymer systems such a colorants, softeners, fillers, antioxidants, plasticizers, and the like.

The invention will be better understood by reference to the following representative examples.

EXAMPLES

A tire which was determined to have an air leak was repaired in accordance with the present invention as follows:

The interior portion of the tire at which the air leak was determined was thoroughly buffed utilizing an OTR buffing tool. In this manner, the innerliner and the tiegum layer were removed down to the first body ply. Then, any damaged body cords were carefully removed. The buffed portion was then cleaned by vacuuming out the last traces of any buffing dust and the like. Next the buffed area was thoroughly cleaned with acetone on Rymplecloth. Generally, the area buffed and cleaned was about 12" to 24" to 12" to 24", then, a patch of a size set forth in the table was lightly buffed and cleaned in the same manner. The treating agent was applied in several coats as a 3 percent solution of trichloro-s-triazinetrione in ethyl acetate. This was allowed to dry. Then, the amine curable urethane system was applied which comprise the following two components. "A" side, 150 gm Adiprene L-367, 150 gm Adiprene 42, 30 gr 4GO and 30 gm of acetone; "B" side, 73 gm Caytur 21.

The thoroughly mixed polyurethane was then coated on to the buffed area of the tire and also to the reinforcing patch which was fully cured and contained no uncured layer. The patch containing the urethane thereon was applied to the buffed portion of the tire which has also previously been treated with the treating agent. The patch was taped into place and firmly held by inflating a curing tube inside the tire. After standing approximately 16-18 hours at an ambient temperature, tape was removed and the tire was placed back into service. The following results were obtained:

| TIRE NO. | TIRE SIZE | PATCH SIZE | ORIGINAL HOURS | REPAIR HOURS | RECENT STATUS |
|---|---|---|---|---|---|
| 1 | 36.00 × 51 | 12" × 12" | 2606 | 1587 | Worn Out |
| 2 | 36.00 × 51 | 12" × 12" | 2763 | 984 | Worn Out |
| 3 | 36.00 × 51 | 12" × 12" | 2068 | 1371 | Off, second rock cut in the tire |
| 4 | 36.00 × 51 | 12" × 12" | 671 | 1647 | Still in service |
| 5 | 36.00 × 51 | 15" × 15" | 2784 | 744 | Off, second rock cut in the tire |
| 6 | 36.00 × 51 | 18" × 18" | 1643 | 575 | Off, patch failed |

As readily apparent from the Table, patches were quite effective in that in Tires #1 and #2, the tire actually wore out. The remaining tires are still in service or have obtained a second rock cut or the patch failed (not the adhesive). With regard to Tire #6, it is noted that the first repair failed because of a weak patch. However, upon replacement with a stronger patch, the performance of the repair improved.

From the above Table, it can been seen that a patch according to the present invention is very effective in repairing the tire as well as sealing air leaks therein.

According to another concept of the present invention, an elastomer article is repaired by making a cavity in the vicinity of the interior crack or cut. The cavity is then filled with a suitable filler and a patch applied thereover.

Figure 2:
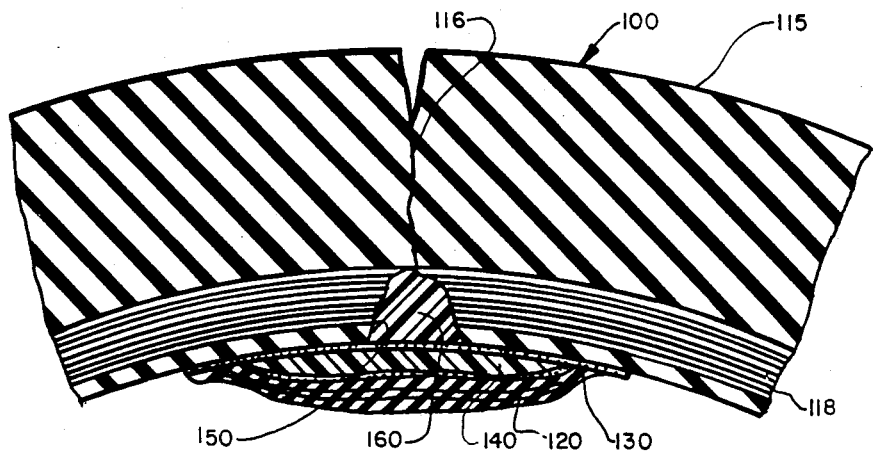
FIG. 2 is a cross sectional view of a reinforced elastomer having a filled cavity as well as a cured patch thereover on the interior side of the elastomer article.

Referring to FIG. 2, an elastomer article is generally disclosed by the numeral 100. The elastomer is generally made from a conjugated diene, or a copolymer made from a conjugated diene and a vinyl substituted aromatic as set forth hereinabove. The article can generally be any reinforced elastomeric article such as a tire, a conveyor belt or the like. The reinforcement is generally in the form of cords 118. A portion 115 of the article is shown having a crack or cut 116 extending therethrough and the repair structure and method of the present invention generally relates to such an article.

According to the present invention, a cavity 150 is made in the elastomer from the interior side thereof in the vicinity of or in the injured area. Although the area of the cavity generally is kept as small as possible, it is important that any injury or damaged area, and especially any damaged reinforcement cords, be removed. Inasmuch as the crack/cut extends through article 110, usually some of the cords and often most if not all of cords 118 will be damaged and hence should be removed in the injured area. Removal can be through the use of any suitable method such as skiving and the like. In skiving, generally a very sharp tool, for example having a tungsten carbide tip, is utilized. The depth of the cavity is usually into the reinforcement area and not beyond. Thus, for a tire, the cavity will extend through the inner liner, through the tiegum layer which bonds the inner liner to the reinforcement area, and into the reinforcement area wherein any damaged reinforcement cords have been removed. Once the cavity has been made, it is desirable to clean it out through a suitable means such as a solvent, for example acetone, or the like. Since cracks or cuts have a variety of sizes, the general diameter of the formed cavity will vary and in a tire can be from about ½" to about 3". The depth of the cavity in a tire such as in a large off-the-road tire can extend up to approximately 1½". Of course, these figures can vary greatly depending upon the size of the tire, or other elastomer article.

After cavity 150 has been cleaned, filler 160 can be added thereto. The filler can be any suitable material which generally has some elasticity therein. In other words, a material is preferred which has a modulus similar to the elastomer article. Other requisites of filler 160 is that it adhere to the elastomer and also impart strength thereto. Examples of suitable fillers include gum rubber as set forth in U.S. Pat. No. 4,434,832, hereby fully incoporated by reference; various polymers such as amine curable polymers or prepolymers, amine curable compositions having rubber particles therein and the like. Inasmuch as various polymers must be cured at elevated temperatures, although they can be utilized, they are not desired in the present invention. Desired polymers include the amine curable polymers and prepolymers inasmuch as they are curable at ambient temperatures. Examples of suitable amine curable polymers and prepolymers include those set forth hereinabove which are hereby fully incorporated by reference as well as the various amine curable polymers and prepolymers set forth in U.S. Pat. No. 4,485,135, also hereby fully incorporated by reference. A suitable amount of the polymer is added to fill the cavity. Although the crack or cut may be large enough such that an opening exists on the exterior side of article 100, there is generally no need to fill said opening.

Optionally and preferably, before filler 160 is added to cavity 150, a treating agent is applied or coated on the surfaces thereof when the filler is an amine curable polymer or prepolymer such as as a polyurethane. Otherwise, a treating agent is not desired. Treating agent 130 can be applied in any manner as by brushing or the like and usually is dissolved in a solvent. Upon drying, it forms a coating which forms a very strong bond to the amine curable filler 160. In other words, the use of treating agent 130 improves adhesion of the amine curable filler to the elastomer article. Suitable types of treating agents are as set forth hereinabove such as the various N-halohydantoins, the various N-haloamides, the various N-haloimides, and combinations thereof. Such treating agents are hereby fully incorporated by reference as well as are the various types and amounts of solvents utilized therewith. As noted above, the various mono-, di-, or trichloroisocyanuric acids, or combinations thereof are preferred.

Once a cavity has been filled with filler 160, cured patch 120 can be applied to the interior portion of the elastomer. However, the interior surface of the article surrounding the cavity is generally prepared as by cleaning, for example, by a mechanical means as by buffing, and/or with a solvent. Treating agent 130, if desirable, is then applied to the area surrounding the cavity and desirably to the filled cavity surface itself which generally is flush with the interior surface of the elastomer article. Treating agent 130 is the same type of agent as utilized to coat the inner surfaces of the cavity as immediately set forth above. The deposition of a layer of treating agent upon the interior surface is desired so that a good bond is formed between the article and the amine curable polymer of prepolymer. The treating agent is also applied to cured patch 120 which is also prepared as by buffing and cleaning with a solvent.

The patch is generally of any desired size so long as it adequately covers the cavity as well as extends a sufficient distance thereabout. Generally, an appropriate size patch will be well known to one skilled in the art of patch construction and/or patch application. The patch type as well as material and reinforcement therein is the same as set forth above and is hereby fully incorporated by reference. Essentially, the patch is made out of rubber and has cords therein. The number of the cords will generally vary with the number of cords in elastomer article 100 which have been damaged and/or removed. The strength of the cords within the patch is generally as set forth hereinabove with regard to FIG. 1. For example, should approximately 50 percent to 100 percent of all cords be severed or removed, the strength of the cords in the patch is generally equal to the strength of the total cords in the article before any injury thereto. Also as noted above, the cords in the patch can be made out of any suitable material such as polyester, nylon, steel, rayon, and the like with nylon being preferred.

The patch is then applied over the cavity area with the treating agent layer residing on said cleaned patch surface facing the cavity or interior portion of the elastomer. To form a good bond between the patch and the elastomer article, an amine curable polymer 140 is utilized. This amine curable polymer or prepolymer can be the same as utilized in the cavity and is also the same as material 40 noted above with regard to FIG. 1. That is, the amine curable polymer or prepolymer is generally a urethane polymer or prepolymer having a molecular weight when cured in excess of 10,000. Typical examples as previously noted can include the various polyurethanes manufactured by DuPont under the Adiprene trademark and the like.

To the amine curable polymer or prepolymer, either in the form of filler 160 or layer 140, is added a conventional amine curing agent known to those skilled in the art and hereby incorporated by reference including the amount used as well as any solvents, especially polar solvents. For example MOCA, methylene dianiline and a salt, or the like can be utilized. Should the filler be gum rubber or other polymers, conventional curatives can be utilized in conventional amounts, as is well known to the art.

Since the amine curable polymers or prepolymers as noted above are curable at ambient temperatures, that is from about 10° C., to about 50° C. and preferably from about 15° C. to about 35° or 40° C., the patch can be bonded to the elastomer article at ambient temperatures. In fact, when filler 160 is the desired amine curable polymer or prepolymer, it can also be cured at ambient temperatures.

The repair construction or method set forth immediately above with regard to FIG. 1 can be utilized on various items such as a tire. Generally, large tires such as off the road tires which have been cut or have a crack therein such that air is lost or are severely lacerated, require reinforcement. According to the present invention, such tires can be repaired on the job site, in situ and an ambient temperature. That is no heat or mold is required. Accordingly, the tire does not have to be taken to a nearby tire repair shop and thus less labor and time are required to repair the injury. The repair of the present invention has also been found to abate and stop crack or cut propagation or growth as well as stop rocks and other foreign materials from penetrating into the patch area.

The invention will be better understood by reference to the following example:

EXAMPLE I

The general preparation of the tire is as follows:

The center of the injury with regard to a large off the road tire is located. The innerliner and tiegum layer down to the first body ply as well as any other damaged body plies is removed. It is important to remove the damaged plies as well as the damaged area to prevent cut growth of the injury. Cut growth is defined as an increase in the size of the cut due to stress applied to the tire. To aid in removal of the damaged cords, a pencil rod tungsten-carbide tool can be used. The amount of non-damaged material removed is kept to a minimum. Next, the cavity created by removal of the damaged area includes the body plies is buffed if possible. Desirably, the patch to be installed should also be buffed as is the area about the cavity. The size of the patch is larger than the cavity. The cavity is then cleaned to remove the last traces of the buffing dust as by vacuuming, brushing or the like. Next, a clean Rymplecloth with acetone thereon is used to thoroughly clean the buffed area. This procedure is repeated until only a faint gray coloration is observed on the Rymplecloth. The solvent cleaned area is then allowed to dry. A treating agent, as described above, is applied to the cavity, to the area about the cavity, to the patch, and permitted to dry. The treating agent can be applied in a few coats in a suitable solvent. After drying, an amine curable system is applied which comprises the two following compositions: The first composition contains 150 grams of Adiprene L-367, 150 grams of Adiprene 42, 30 grams of 4GO, and 30 grams of acetone. The second composition contains approximately 73 grams of Caytur 21. The two urethane compositions were then thoroughly mixed and applied to the cavity to an extent that it was essentially filled to the interior surface of the tire. The urethane system is also applied over the treated buffed area of the tire as well as of the patch. The patch was then applied to the tire over the cavity area, held in place by tape and a curing tube inside the tire, inflated, and allowed to dry at ambient temperature. After approximately 12–18 hours at ambient temperature, the tape was removed and the tire placed back into service.

In accordance with the above general procedure, the following tires were treated.

TABLE

| TIRE NO. | BRAND OF TIRE | PATCH SIZE | ORIG- INAL HOURS | REPAIR HOURS | RECENT STATUS |
|---|---|---|---|---|---|
| 1 | 36.00 × 51 | 12" × 12" | 1653 | 5324 | Removed Ply Separation |
| 2 | 36.00 × 51 | 14" × 14" | 879 | 865 | Redo Patch Failed |
| 3 | 36.00 × 51 | 14" × 14" | 2784 | 744 | Second rock cut in tire |
| 4 | 36.00 × 51 | 18" × 18" | 1408 | 625 | Cut too large |
| 5 | 36.00 × 51 | 16" × 16" | 2769 | 931 | Second rock cut in tire |
| 6 | 36.00 × 51 | 12" × 12" | 1927 | 1123 | Running |
| 7 | 36.00 × 51 | 12" × 12" | 2271 | 1276 | Running |
| 8 | 36.00 × 51 | 14" dia. | 2660 | 540 | Tread |

TABLE -continued

| TIRE NO. | BRAND OF TIRE | PATCH SIZE | ORIGINAL HOURS | REPAIR HOURS | RECENT STATUS |
|---|---|---|---|---|---|
| | | (Round Patch) | | | Separation |

In all cases, the removal of the tire was not due to failure of the adhesive or tire repair procedure of the present invention. Moreover, it is noted that the procedure of the present invention gave a very surprising and unexpected result in that this procedure is opposite from standard tire repair practices. That is, it is steadfast and understood by the industry that the whole tire must be repaired in order to make a durable repair.

As apparent from the Table, it can be seen that a tire repair having an interior cavity as well as a patch thereover is very effective in repairing the tire as well as stopping air leaks therein.

A further aspect of the present invention relates to an elastomer article having a hollow therein. A preformed elastomer plug resides within the hollow and is adhered thereto. This aspect of a plug repair of an elastomer article is also applicable to the above crack/cut embodiments wherein the crack/cut portion is a hollow having a crack extending into a reinforced area.

The elastomer article, generally indicated by the number 200, can be any conventional elastomer or rubber known to art as well as to the literature and typically has unsaturated groups therein. Thus, it can be made from conjugated dienes having from 4 to 12 carbon atoms such as butadiene, isoprene and the like. Various other elastomers can be utilized as set forth hereinabove and such are accordingly fully incorporated by reference. Thus, styrene-butadiene rubber and the like can be utilized.

Figure 3:
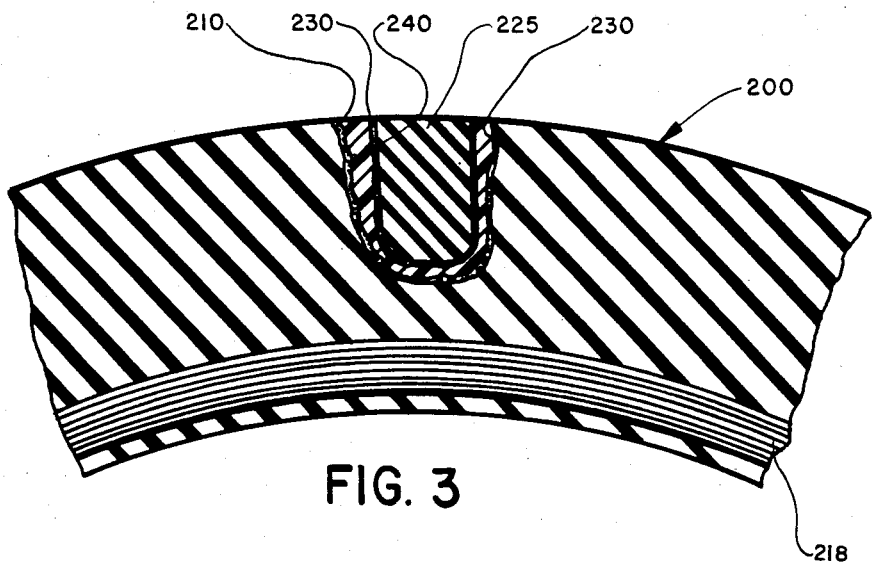
FIG. 3 is a cross sectional view of a reinforced elastomer article having a preformed plug in a hollow portion of the elastomer article.

Elastomer article 200 typically, but not necessarily, has reinforcement 218 therein as in the form of cords, belts or the like. According to the embodiment of FIG. 3, hollow 210 generally does not extend into any reinforcement area. In other words, hollow 210 generally resides within a "reinforcement free" portion of article 200. That is, the hollow generally resides solely within an elastomer portion of the article as shown in FIG. 3. Hollow 210 can be a gouge, a large cut, an opening and the like and thus forms an exterior cavity in the elastomer portion of the article.

The injured or hollow area is usually cleaned to remove all foreign debris, loose elastomer portions and the like. Cleaning can take place by any number of abrasive methods as by buffing out the injured hollow area making sure that all damaged portions are removed. The cleaning step can also be utilized to shape the hollow into a desirable size or shape such that it can receive plug 225 therein. In order to yield improved results, the hollow area or volume thereof is substantially filled by the plug. By substantially filled it is meant that at least 50 percent of the hollow volume, desirably at least 70 percent, more desirably at least 80 percent and preferably at least 90 percent of the hollow volume is filled by plug 225. Plug 225 is a material which is compatible with the elastomer article. That is, it is generally a material which has the same or similar physical properties as the elastomer portion of the article as for example modulus, elongation, elasticity, tensile strength, wear rate and the like. It thus can be obtained from a similar article.

It is an important aspect of the present invention that plug 220 be previously cured before insertion into hollow 210 and that it be preformed. Since tires, e.g. sidewall areas and tread portions, conveyor belts and the like are already cured, they form a very suitable preformed plug source. Moreover, since they are obtained from a spent or used article, they are very economical. Generally and desirably, the preformed plug is a soft rubber. That is, it has been found that rubber plugs generally having a lower modulus than the article are a good plug material and extend the life of the repair. Any suitable material can be utilized such as a plug taken from another tire, for example an old tire, or one which is tailor made from synthetic materials. By lower modulus it is meant that the hardness of the rubber plug is usually less, although it can be higher, that is harder, than the hardness of the repair area, for example, a tire tread. Preferably, the modulus is lower than the repaired elastomer. In terms of Shore A hardness, the preformed plug has a hardness of from about 52 to about 85 and desirably from about 55 to about 65. Inasmuch as plug 225 is compatible with the elastomer article, it is generally of the same type of material as the elastomer as set forth herein above and hence is hereby fully incorporated by reference. Thus, plug 225 can be an elastomer made from conjugated dienes having from 4 to 12 carbon atoms, natural rubber, copolymers of vinyl substituted aromatic compounds having from 8 to 12 carbon atoms and conjugated dienes having from 4 to 12 carbon atoms, and the like. Examples of plug materials include polybutadiene, both synthetic and natural polyisoprene, polypentadiene, nitrile polymers or copolymers with butadiene or styrene, styrene-butadiene rubber, various derivatives of styrene-butadiene rubber, and the like.

Various conventional curing agents in conventional amounts can be utilized to cure the rubber materials to form the preformed plug should it not already be cured. Such type of rubber polymers as well as curing agents are well known to the art as well as to the literature. Naturally, the preformed plugs can contain various additives therein such as fillers, reinforcement agents such as carbon black, antioxidants, antiozonates, and the like, all as known to the art and to the literature. Plug 225 can thus contain various conventional additives in conventional amounts as utilized in a tire sidewall stock, a conveyor belt, and the like. The plug can be made in different lengths and widths by curing the various types of rubber required in a mold and then cutting or shaping the same into a desired final size as by buffing utilizing conventional equipment.

Regardless of the particular material utilized to form the preformed plug, the plug is generally more pliable and durable than the repaired elastomer and thus has been found to be generally retained in the hollow for a much longer period of time than a non-elastomer plug. For this reason, various urethanes as well as amine curable polymers or prepolymers as described hereinabove, are generally not desired as a plug material.

Once a suitable, compatible elastomer plug source is obtained, it is cut by any conventional method such as skiving to a shape and size which substantially fills hollow 210. Foreign debris, loose particles, etc. are removed according to any conventional cleaning method such as through buffing, and the like. Next, both the interior portion of the hollow and the exterior portion of the plug are usually washed with a solvent. The solvent can be any conventional solvent including organic solvents known to the art and to the literature.

Suitable organic solvents include acetone, ethyl acetate, and the like.

The use and application of a treating agent 230, an amine curable polymer or prepolymer 240 containing a curing agent, etc., therein is generally as set forth hereinabove and hence will only be briefly discussed with the above discussion being hereby fully incorporated by reference. Treating agent 230 is thus applied to the hollow as well as to the plug to form a coating thereon. Suitable treating agents include the various N-halohydantoins, the various N-haloamides, the various N-haloimides, and combinations thereof, as set forth herein above and hereby fully incorporated by reference. Preferred treating agents 230 include the various mono-, di-, or trichloroisocyanuric acids, or combinations thereof. Trichloroisocyanuric acid is especially preferred. As noted above, since the treating agents usually exists in solid form, but are readily soluble in organic solvents such as acetone and the like, they are generally disolved therein and applied in a solution. Application of the treating agent generally occurs at ambient temperature and can be applied in any conventional manner as through brushing, spraying and the like. Preferrably, two or more coats of the treating agents are applied to ensure that all the desired surfaces are coated. The amount of solvent which is utilized is set forth hereinabove.

Once a treating agent has been applied and dried at ambient temperature, various amine curable polymers or prepolymers are applied to the interior portion of hollow 200 as well as to exterior portion of plug 225. The various amine polymers or prepolymers which act as an adhesive and bond the plug to the treated elastomer article are set forth hereinabove and accordingly are hereby fully incorporated by reference. Desirably, such polymers or prepolymers are urethane. The amine curable polymers or prepolymers generally contain conventional or known amine curing agents therein such as MOCA, a complex of 4,4'-methylenedianiline and a salt, and the like. The equivalent weight of the curing agent utilized generally ranges from about 85 percent to about 115 percent with from about 95 percent to 105 percent being preferred based upon the weight of the amine curable polymer or prepolymer. As also noted above, various plasticizers can be utilized with the curing agent. The polymer or prepolymer component is generally mixed with a polar solvent so that a liquid system is obtained and can be readily applied to plug 225 as well as to hollow 200. The amount and type of polar solvents are set forth hereinabove and are accordingly fully incorporated by reference.

Once plug 225 as well as the interior portion of hollow 210 are coated with the mixture containing the amine curable polymer or prepolymer, the plug is inserted into the hollow. Naturally the amount of amine curable polymer or prepolymer 240 is sufficient such that once plug 225 has been inserted therein, substantially and preferrably all of the openings or channels between the plug and the elastomer article are filled. The size and shape of plug 255 is furthermore such that upon insertion into the hollow, the top surface of the plug is desirably flush with the top or exterior surface of article 200.

Inasmuch as the amine curable polymer or prepolymer mixture is curable at ambient temperature, a strong bond will be formed between treating agent layer 230 and elastomer plug 225. By the term ambient it is meant any temperature at which the repair is made. Since the repair can be made in-situ, it will generally be made outdoors and hence is at the temperature of the surrounding air. Inasmuch as very low temperatures require too long of a cure time, they are not desired. An ambient temperature is accordingly from about 10° C. to about 50° C. with a preferred temperature range being from about 15° C. to about 30° C. The repair of the hollow according to the present embodiment of the invention in occuring at ambient temperature is highly convenient as well as easy and simple to conduct. Should the elastomer article be a large off-the-road tire, the need to take the tire to a tire retread or repair shop is eliminated. In many situations, the tire can be repaired on the rim with the tire rotated such that the hollow is located in the upper most portion or top position. The repair is very economical in that it is made in-situ. Since a non-urethane or a non-amine polymer or prepolymer compound is utilized as the plug, improved properties are obtained such as increased durability.

Figure 4:
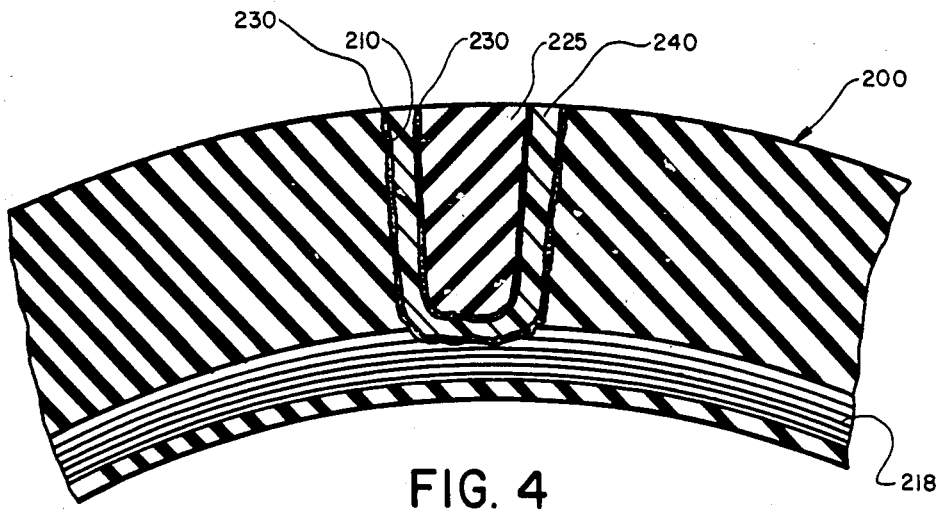
FIG. 4 is a cross sectional view of a reinforced elastomer article having a preformed plug in a hollow portion of the elastomer article wherein the preformed plug extends into the reinforcement area.
Figure 5:
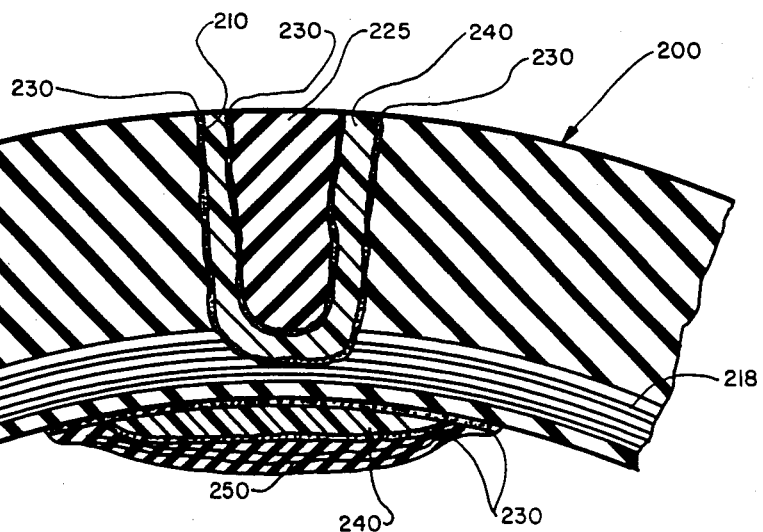
FIG. 5 is a cross sectional view of a reinforced elastomer article having a preformed plug in a hollow portion of the elastomer article wherein the preformed plug extends substantially into the reinforcement area and a patch is located on the interior portion of the article.

According to the concepts of the present invention, preformed plug 225 can be applied to various size hollows. For example, in the embodiment shown in FIG. 3, the cured plug is applied to a hollow which partially extends in the reinforcement free portion of the article. That is, it does not extend into the cords of the reinforced article. In the embodiment of FIG. 4, hollow 210 partially extends into the reinforcement area 218. The remaining structure, layers, etc. are otherwise the same as in the embodiment of FIG. 2 and hence will not be repeated but rather is hereby fully incorporated by reference. Thus, the embodiment of FIG. 4 will contain a plug 225, a treating agent layer 230 thereon, an amine curable polymer or polymer layer 240, and another treating agent layer 230 coating the inside of the hollow. Generally, when the hollow extends into approximately 25% or less of the reinforcement area, an internal patch as utilized above with regard to the embodiments of FIGS. 1 and 2, is not necessary. By the term 25% of the reinforcement area, it is meant that the hollow has severed less than 25% of the total number of reinforcing cords in the hollow area. However, when the hollow generally extends in excess of 25% into the reinforcement area, a patch 250 is added to the interior portion of the article in the vicinity of the hollow. In this embodiment, that is FIG. 5, the hollow has severed generally greater than 25% of the existing cords. Accordingly, preformed plug 225 is applied in the manner as set forth above. That is, the hollow is cleaned as by skiving, buffing or the like. An appropriate treating agent 230 is applied to the walls of the hollow. Preformed elastomer plug 225 coated with treating agent 230 is then applied to the hollow and adhered to article 200 through the use of an ambient temperature cure amine polymer or prepolymer which fills the opening or channels between the plug and the article. In order to strengthen the article, an interior patch 250 is also applied. To ensure good adhesion of patch 250 to article 200, treating agent 230 is applied to the interior surface of the article in the vicinity of the hollow. Treating agent 230 is also applied to one side of patch 250. The amine curable polymer or prepolymer 240 is then applied to the treating agent residing on the interior portion of the article and to the treated side of patch 250. The patch is then applied to the interior portion of the article. Cure occurs at ambient temperature. As noted above, patch 250 has reinforcing cords therein. The strength of patch 250 to the interior portion of the article is generally at least equivalent to the strength of the severed cords and desirably stronger than the severed cords. The application of patch 250 to the interior portion of the article is generally the same as set forth hereinabove with regard to FIGS. 1 and 2 and accordingly the description thereof is hereby fully incorporated by reference including preparation of the interior surface as by buffing, and the like.

Figure 6:
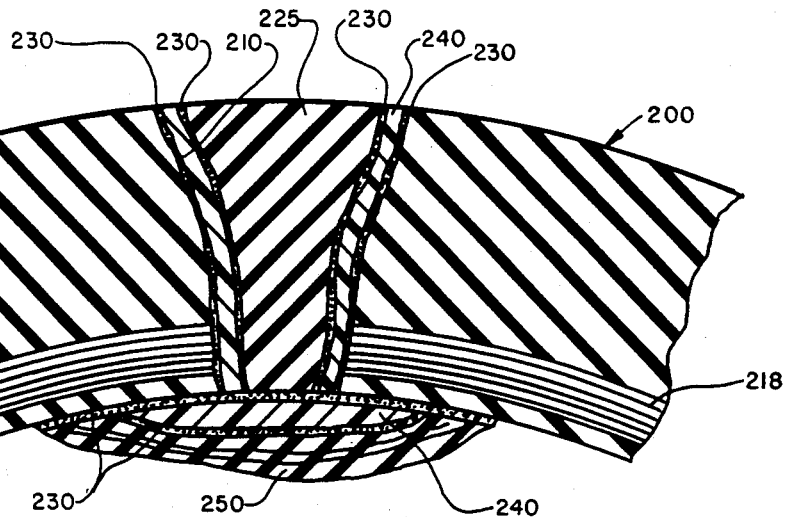
FIG. 6 is a cross sectional view of a reinforced elastomer article having a preformed plug in a hollow portion of the elastomer article wherein the hollow extends through the article and a patch is located on the interior portion of the article.

In the event that hollow 210 extends entirely through the reinforced article as in FIG. 6, the preformed plug 225 applied thereto can also extend through the entire article. The application of the plug in embodiment 6 as is set forth hereinabove. By way of a brief summary, the hollow is cleaned as described above, and treated agent 230 applied thereto. A preformed plug 225 is then sized, buffed, cleaned, coated with treating agent 230, coated with an amine curable polymer or prepolymer, and inserted into the treated hollow. Additional amine curable polymer or prepolymer 240 is then inserted into the channel about plug 225 as needed and allowed to cure at ambient temperature. Once again, the result is a soft pliable plug which has good adhesion to article 200. Since hollow 210 extends entirely through article 200, a patch 250 is utilized in the interior portion of the article. The application of the patch and various components thereof is as set forth above with regard to FIG. 5 and hence will not be repeated. The strength of patch 250 which has reinforcing cords therein is desirably at least equal to the strength of severed cords 218 and desirably is stronger. Alternatively, the patch can be applied in a conventional manner, that is, not utilizing treating agent 230 or the amine curable polymer or prepolymer 240 of the present invention.

Regardless of the method of repair, that is whether or not the injury extends into the reinforcement area, the important aspect of the present invention is the utilization of a cured preformed plug of a size and shape substantially conforming to the configuration of the hollow. Inasmuch as a compatible material is utilized, increased durability is generally obtained. Moreover, as apparent from the drawings, plug 225 is generally wider at the top than at the bottom. This is because most article grouges or openings (hollows) have a larger opening at the exterior portion of the article than at the interior portion. The preformed, solid plug is thus generally tapered inward toward the interior portion of the article.

The invention will be better understood by reference to the following example.

EXAMPLE II

A 36.00×51 Super Rock Grip Deep Tread tire (Firestone) having an 8" long and 2"-3" deep cut in the center of the tire tread at about a 5 degree angle to the circumference was utilized. The tire was in service on a 170 ton dump truck. At the time of the repair the tire was in use 2,493 hours. Typically tire life at the same location, a mine in Montana, was about 10,000 hours. The ply rating of the injured tire was 50 plys. The injury was buffed out using a 4" cone rasp. Sixteen grit surface with care being taken so that all damaged areas were removed, that is traces of the cut. The hollow after buffing was 9" long, 3" deep and about ⅞" in width. The hollow did not extent into the ply layer. A plug was made by cutting a piece from the sidewall of a scrap tire. The shape of the plug was approximately 8" long, 2½" deep, ½" in width at the top tappering to approximately ¼" in width at the bottom. The rubber plug which contained no reinforcement therein was buffed. The tire hollow and the rubber plug were then thoroughly washed with acetone. The surfaces were allowed to thoroughly dry and then 3 coats of a 3 percent solution of trichloro-s-triazinetrione were brushed on to all of the buffed and washed surfaces of the tire hollow and the plug and allowed to dry. A 50/50 polyurethane bonding mixture consisting of 150 gm of Adiprene L-367 (approximately 6.5% NCO), 150 gm of Adiprene L-42 (approximately 4.2% NCO), 30 gm of 4GO and 30 gm of acetone mixed with 73 gm of Caytur 21 was made and coated onto the surface of the rubber plug and then poured into the tire hollow. The sides of the tire hollow were also coated. The plug was then inserted into the cavity. The plug was held in place by use of duct tape. A heating pad was used to maintain the temperature at ambient conditions, i.e. less than 110° F., and to facilitate an even cure rate. The repair was allowed to cure 16–18 hours in this manner. After the required cure time, the damaged area was repaired. The tire was placed back into service and the repair was still in good shape, after the tire had run 1188 hours. The tire is still running.

The above description with regard to a preformed plug is pertinent to the following embodiments or aspects. However, they are not claimed in this application but rather in another application simultaneously filed herewith.

The further aspects or embodiments of the present invention relate to the use of a grid to provide reinforcement on the interior portion of an elastomeric article in the vicinity of an injury, that is, a hollow. The hollow generally extends entirely through the article and can be repaired as by filling the hollow with an amine curable polymer or prepolymer or through the utilization of a preformed plug, both as described hereinabove and accordingly is hereby fully incorporated by reference. Moreover, the hollow can also exist only in the interior portion of an elastomer article generally having a crack or cut in the exterior portion thereof, as shown in FIG. 2, and also have a grid located on the interior portion of the article as described in detail in Examples 3, 4, and 5, set forth hereinbelow. The elastomer article is generally indicated by the numeral 300 and can be any conventional elastomer or rubber known to the art as well as to the literature. Typically, elastomer 300 contains unsaturated groups therein. Elastomer 300 can be made from any type of rubber forming monomers, as set forth herein above and hereby fully incorporated by reference. Various rubber forming monomers thus include the various conjugated dienes having from 4 to 12 carbon atoms such as butadiene, isoprene, natural rubber, synthetic cis-1,4-polyisoprene, pentadiene, and the like. Additionally, the rubber can be a copolymer made from various diene monomers or various diene monomers in association with various vinyl substituted aromatic monomers having from 8 to about 15 carbon atoms as, for example, styrene. Styrene-butadiene rubber thus constitutes a preferred copolymer.

Elastomeric article 300 typically, but not necessarily, contains reinforcement 318 therein as in the form of cords, belts, or the like. Reinforcement 318 can be of any conventional material as well as materials known to the art and to the literature.

Article 300 generally forms an enclosure, either in and of itself or in association with another article, and generally is capable of being pressurized by a fluid, that is a liquid or a gas. Article 300 is generally a pneumatic article such as a tire although it can be other articles as well such as a hose, and the like.

An injury, typically in the form of hollow 310, generally extends entirely therethrough. That is, often hollow 310 extends from the exterior surface of the article to the interior surface such that an opening or aperture is formed entirely through the article. The hollow is repaired in various manners as through the use of a filler, for example, an amine curable polymer or prepolymer, a preformed plug, and the like, as discussed herein above and hence is hereby fully incorporated by reference. It has been found that upon extended usage the filler or plug 325, evidently due to the existence of pressure within article 300 or the existence of various compression forces applied thereto, can at times be separated and/or even removed from the article. Even if not dislodged from the article, separation of filler or plug 325 from article 300 still generally results in loss of article pressure.

According to the present aspects of the present invention, it has surprisingly been found that the utilization of a non elastomeric grid protects and/or prevents the filler or plug from separation and/or removal. Grid 320 can generally be made out of any non-elastomeric material. Generally the grid is made from a polymer such as nylon or an aromatic nylon, that is polyaramide, rayon, polyester, polypropylene, and the like and such are preferred. The grid can also be made out of fiberglass, or metals such as steel.

The grid is desirably tough and has a strong modulus, that is, it is not unduely flexible so that various impact or compression forces are not transferred to filler or plug 325 and/or are damaged. Strength and toughness can be imparted to the grid in various ways as by utilizing thicker fibers, a higher modulus polymer, and the like. Such properties can vary. For example, the breaking strength of a nylon cord can vary from about 20 lbs./cord to about 105 lbs./cord. The breaking strength will naturally be different for different materials.

Regardless of the type of grid material, an important criteria of the grid is that it contain open spaces or open areas therein so that an adhesive can impregnate the grid and adhere the same to the interior surface of article 300. That is, as discussed more fully hereinbelow, an adhesive or an amine curable polymer permeates or impregnates the grid and adheres it to the interior of the article in the vicinity of the repaired injury. The amount of open area is generally from about 5% to about 90% and desirably from about 20% to about 80% based upon the total grid area.

Grid 320 can generally exist in any form so long as it contains an effective amount of open areas for good adhesion to the article interior surface. It can thus exist in the form of a mat, that is fibers laid upon one another in generally a non-woven fashion. Desirably, grid 320 is in the form of a woven material. Generally, any conventional weave can be utilized such as square weave. Other suitable weaves are known to the art and to the literature.

The shape of the grid can be any desirable shape as long as it traverses as well as desirably follows the contour of the hollow as it exists on the interior surface of the article. Should the hollow not extend entirely through the article, but substantially therethrough, the grid nevertheless is larger than the innermost hollow width or area. That is, should a circular hollow exist, the grid can be circular. If the hollow is rather elongated, the shape of the grid is rectangular, or the like.

The size of grid 320 is larger than the interior hollow portion or opening and generally contains an area of at least 50% greater than the hollow portion or opening. Desirably, the grid area is at least 100% larger than the interior hollow and preferably at least 200% larger. Naturally, even larger size grids can be utilized as those containing an area of 400% or greater than the area of the innermost hollow portion or opening. However, the size of the grid must be less than the size of the patch 350.

Grid 320 of the present invention is generally utilized in association with a patch, such as those set forth hereinabove as well as more fully discussed hereinbelow. The utilization of the grid has been found to effectively prevent the patch from being pushed or punched into the injured area. The stability of the patch and the surrounding damaged areas are accordingly improved. The filler or plug 325 is thus protected from separation and/or removal from the pressurizable article. Another advantage of the grid is that much larger injuries in pressurizable articles can be repaired than otherwise heretofore possible. For example, the previous practical repair limit of approximately a 5 inch injury (length+-width) in a tire is no longer critical.

Figure 7:
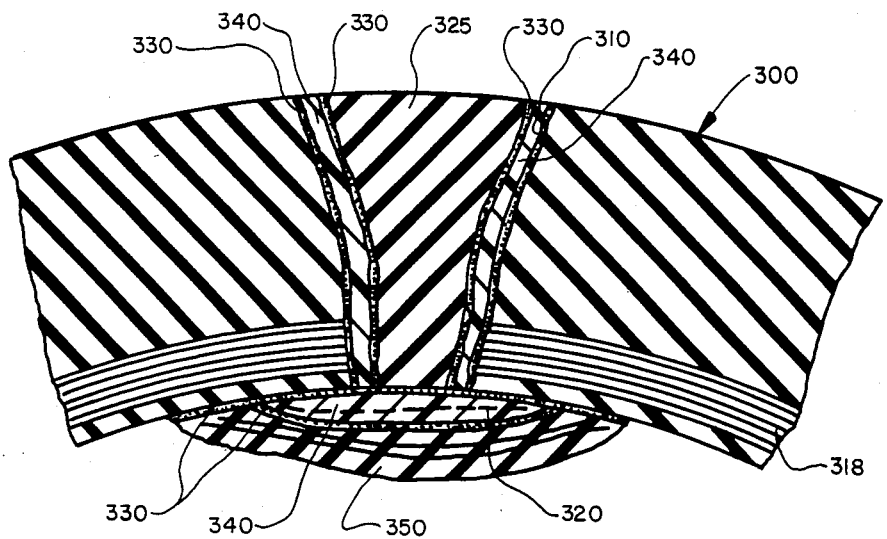
FIG. 7 is a cross sectional view of an elastomer article having a repaired portion extending therethrough and having on the interior of said article a grid and a patch.

Grid 320 is applied to the vicinity of the intermost hollow portion or opening generally through the use of an amine curable polymer or prepolymer as discussed hereinbelow and also in combination with a patch, also as discussed hereinbelow. Hollow 310 can be repaired and filled in any manner with various materials as known to the art and to the literature. For example, hollow may be filled with an amine curable polymer as set forth in U.S. Pat. No. 4,485,136 which is hereby fully incorporated by reference; with a rubber particle containing amine curable polymer or prepolymer as set forth in U.S. Pat. No. 4,485,135 hereby fully incorporated by reference; or with a gum rubber as set forth in U.S. Pat. No. 4,434,832 also hereby fully incorporated by reference. Thus, referring to FIG. 7, the hollow can be cleaned out in a manner as set forth hereinabove as through buffing, skiving, and the like. Next, the interior portion of hollow 310 as well as the interior portion or opening of the article in the vicinity of hollow 310 is cleaned with a solvent. The solvent can be any conventional compound, generally an organic solvent as set forth hereinabove and hereby fully incorporated by reference. Suitable solvents include acetone, ethyl acetate, and the like. A treating agent 330 is then applied to the cleaned surfaces. Suitable treating agents are the same as set forth hereinabove and include various N-halohydantoins, various N-haloamides, various N-haloimides, and combinations thereof. Examples of such specific compounds are set forth above and accordingly are hereby fully incorporated by reference. Preferred treating agents include the various mono-, di-, or tri-chloroisocyanuric acids, or combinations thereof. Trichloroisocyanuric acid is especially preferred. After the treating agent has been applied, the hollow can either be filled with an amine curable compound or a preformed plug. The amine curable compounds are as set forth hereinabove and hence are fully incorporated by reference. As noted above, amine curable polymers or prepolymers can be utilized containing rubber particles therein as set forth in U.S. Pat. No. 4,485,135. Filler 325 can be a gum rubber as set forth in U.S. Pat. No. 4,434,832. Alternatively, item 325 can be a preformed plug as set forth herinabove and accordingly hereby fully incorporated by reference. When item 325 is a preformed plug, it is adhered to article 300 through the use of a treating agent 330 and an amine curable polymer or prepolymer 340 as fully described hereinabove. In a similar manner, the hollow of FIGS. 3, 4, 5 or can be repaired. When item 325 is not a rubber plug but a filler, no treating agent 330 exists thereon.

Regardless of the type of filler, preformed plug, or the like utilized to substantially fill hollow 310, the interior portion of the article about said hollow is cleaned as by buffing, washing with a solvent, etc., in a manner as described hereinabove, e.g. FIGS. 2-7, and hence is hereby fully incorporated by reference. The interior portion in the vicinity of the hollow is coated with one or more coats of a treating agent 330 such as a N-halohydantoin, or the like, as described hereinabove. Once treating agent 330 dries, an amine curable polymer or prepolymer 340 as described hereinabove, is applied thereto. Since a patch 350 is also utilized, the treating agent 330 and the amine curable polymer or prepolymer 340 is also applied to one side of the patch. Patch 350 is an elastomeric rubber patch desirably containing reinforcement cords therein as hereinabove described and accordingly is hereby fully incorporated by reference. Grid 320 which desirably has been washed with a solvent to remove dirt, oil, grease, etc. is then applied to the amine curable polymer or prepolymer layer 340 residing on the article interior and pushed into the same. It is important that the grid be pushed or forced into amine layer 340 to insure that any air bubbles are removed therefrom as well as to permit the amine material to penetrate through the open areas of the grid. Otherwise, good or proper adhesion between the grid and the amine layer will often not be achieved. Similarly, patch 350 having amine layer 340 thereon is applied over the grid and firmly pushed in place to remove air bubbles therefrom as well as to allow the amine material to penetrate into the grid and through the various openings thereof. In other words, the grid openings are impregnated or saturated with the amine curable polymer or prepolymer. Alternatively, the grid can be coated or impregnated with the amine curable polymer prior to application to the interior hollow area. Inasmuch as the amine curable polymer or prepolymer is curable at ambient temperature, the application of the grid and repair of the interior vicinity of the hollow occurs at room temperature. That is, as noted hereinabove, cure can take place at a temperature of from about 10° C. to about 50° C. and desirably from about 15° C. to about 30° C. Inasmuch as the application of the grid including the optional but desirable patch occurs at ambient temperature, the repair can take place in-situ. That is, the article such as a giant earth moving tire, a hose, or the like need not be taken to the nearest repair shop but can be repaired on site or at the actual location of the injury. Costly down time is thereby saved as well as time and expense of transportation and the like.

The patch strength is desirably at least equal to the strength of the severed reinforcement 318 of the article. Thus, as noted above and hereby fully incorporated by reference, patch 350 will have a number of cords therein at least equal in strength to cords 318 of the repaired article.

Inasmuch as the repair of the hollow area and the utilization of the patch has been set forth hereinabove, they have been briefly discussed for purposes of brevity. Should any aspect thereof have not touched upon with regard to the grid aspects or embodiments thereof, such as hereby fully incorporated by reference.

The grid aspects can be utilized in association with various pressurized articles, typically pneumatic articles such as passenger tires and especially off-the-road tires, hoses, and the like. The repair area with regard to a tire can either be in the tread area or in the sidewall portion.

The invention will be better understood by reference to the following example:

EXAMPLE III

A 36.00×51 Rock Master—50 ply—brand 8093R was repaired by the following procedure: The damaged area was buffed out using a 16 grit tungsten-carbide cone rasp. It is imperative to remove all of the damaged body plies. The injury size was 3½"×3" in the body ply area and located 3" from the center line of the tire. The interior of the tire was buffed down to the top of the third body ply. A fully cured EL-6 patch (ROSCON, Inc.) was also buffed using a 16 grit tungsten-carbide curved radius rasp. The cushion layer was buffed. All buffed areas were then thoroughly washed with acetone and allowed to dry. To the dried surfaces of the tire and the patch, a 3% trichloro-s-triazinetrione in ethyl acetate was applied. Three coats were used. This primer solution was allowed to thoroughly dry. An amine curable polymer consisting of 150 gm of Adiprene L-42 (approximately 4.2% NCO), 150 gm of Adiprene L-367 (approximately 6.5% NCO), 30 gm 4GO and 30 gm acetone along with 73 gm of Cayture 21 was mixed and poured into the damaged area (body ply area only). This was allowed to gell before any additional work was performed. Then additional amine curable polymer was applied to the patch surface (buffed side) and to the inside of the tire in the vicinity of the damaged area. A piece (10"×10") of square woven nylon monofil (previously washed and dried) was evenly applied to the urethane adhesive and pushed down into the urethane. The patch was then placed on top and firmly pushed in place beneath the grid. The patch was taped in place and a piece of plastic placed over the surface of the patch and a heating pad (2-12"×24" heat pads taped together) placed on top of the plastic in order to promote an even cure of the urethane adhesive at ambient temperature, i.e., no greater than 110° F. Two air bags were then installed over the patch and inflated in order to put even pressure on the patch and to prevent the patch from separating from the tire surface during the cure cycle. The patch/adhesive system was allowed to cure for 14 hours. The following day the patch looked very good. It was tight in all areas. After three days the tire was mounted on a rim and placed into service. The tire was removed from service at near wear out, because of failure of the tire in the body plies. The tire ran for 808 hours.

As apparent from the above example, the filled hollow area was unaffected by subsequent extended use of the tire such that the tire failed due to causes unrelated to the repair.

EXAMPLE IV

In a similar manner to Example III, a 37.5-39, E-3, 44 ply scrapper tire was repaired. The injury size was 3¾"×5". The size of the square woven, monofil nylon mesh used was 11" square. The patch size used was a fully cured EL-6 (Rocson Inc.). After installation the repair looked excellent. The tire was placed back into service and currently has been running 8 months. This is an excellent result.

EXAMPLE V

Also in a similar manner to Example III, a 36.00×51, E-4, 50 ply hauler tire was repaired. The injury size was 5⅝"×2½". The size of the square wove, monofil nylon mesh used was 12" square. The patch size used was a fully cured Tor 8 (EL-7) (Technical Rubber Co.). After installation the repair looked excellent. The tire was placed back into service after 3 days. The tire ran for 207 hours at which time it was removed because of a ply separation in the tire. This was unrelated to the repair which was still tight at the time the tire was removed from service.

While in accodance with patent statutes, a preferred embodiment and best mode have been set forth in detail, various modifications thereof can be made without departing from the scope of the present invention. Accordingly, the breadth of the present invention is measured by the scope of the attached claims.

What is claimed is:

1. A repaired elastomer article; comprising:
   the elastomer article, said elastomer article being cured and capable of being pressurized, said elastomer article having a hollow therein, said hollow having a repair material therein, said article having an interior hollow surface area,
   an elastomer free grid, said grid located on said article interior surface area and traversing said interior hollow area, said grid adhered to said article interior by an amine curable polymer or prepolymer, and
   a rubber patch, said patch having reinforcement therein, said patch residing on said amine adhered grid.

2. A repaired elastomer article accordingly to claim 1, wherein said amine curable polymer or prepolymer is curable at ambient temperature, and wherein said amine curable polymer or prepolymer is selected from the group consisting of an epoxy resin, a halogen-containing hydrocarbon polymer, a chlorosulfonated polymer, a polymer containing an acid halide group such as

or haloformate group such as

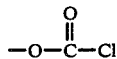

a polymer containing anhydride groups which on reaction with a diamine yield an amide linkage, an organopolysiloxane, a urethane polymer or prepolymer, and combinations thereof.

3. A repaired elastomer article according to claim 2, including a treating agent, said treating agent coating said interior hollow surface area, said treating agent selected from the group consisting of an N-halohydantoin, an N-haloamide, and N-haloimide, and combinations thereof, said treating agent coating said interior article surface in the vicinity of said injury, said grid having open areas therein, said grid having a size of at least 50% larger in area than said interior hollow area.

4. A repaired elastomer article according to claim 3, wherein said article has reinforcement therein, wherein said amine curable polymer or prepolymer impregnates said grid, said patch residing on said amine polymer or prepolymer impregnated grid.

5. A repaired elastomer article according to claim 4, wherein said grid is a weave of a polymeric material, fiberglass, or a metal.

6. A repaired elastomer article according to claim 5, wherein said ambient cure temperature is from about 10° C. to about 50° C., and wherein the size of said grid is at least 100% greater in area than said interior hollow area.

7. A repaired elastomer article according to claim 6, wherein said hollow is coated with said treating agent, wherein said hollow repair material is an amine curable polymer or prepolymer or a preformed plug, and wherein said elastomer free grid is nylon, polyaramide, rayon, or polyester.

8. A repaired elastomer article according to claim 7, wherein said size of said grid is at least 200% greater in area than said interior hollow area, wherein said treating agent is selected from a group consisting of monochloroisocyanuric acid, dichloroisocyanuric acid, trichloroisocyanuric acid, and combinations thereof, and wherein said amine curable polymer or prepolymer is a urethane polymer or prepolymer.

9. A repaired elastomer article according to claim 4, wherein the strength of said patch reinforcement is at least equal to the strength of said elastomer article reinforcement.

10. A repaired elastomer article according to claim 8, wherein said hollow is located in the interior portion and extends into at least said reinforcement portion of said article and wherein said article is a tire.

11. A repaired elastomer article according to claim 8, wherein said hollow extends through said article, and wherein said article is a tire.

* * * * *

UNITED STATES PATENT AND TRADEMARK OFFICE
CERTIFICATE OF CORRECTION

PATENT NO.   : 4,696,332
DATED        : September 29, 1987
INVENTOR(S)  : Russell W. Koch It is certified that error appears in the above-identified patent and that said Letters Patent are hereby corrected as shown below:

Column 15, line 60 "255" should be "225"

Signed and Sealed this

Twenty-fourth Day of May, 1988

Attest:

DONALD J. QUIGG

*Attesting Officer*    *Commissioner of Patents and Trademarks*